Nov. 28, 1933.  A. JENKINS  1,937,346
PROCESS FOR FORMING INTERIORLY FIGURED VITREOUS BOWLS
Filed Nov. 13, 1931
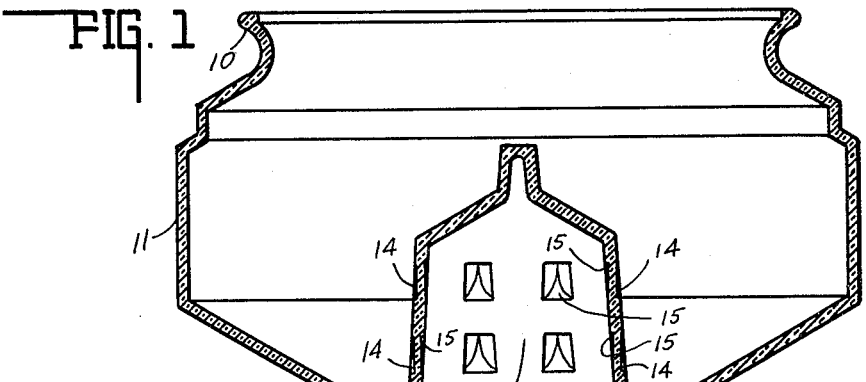
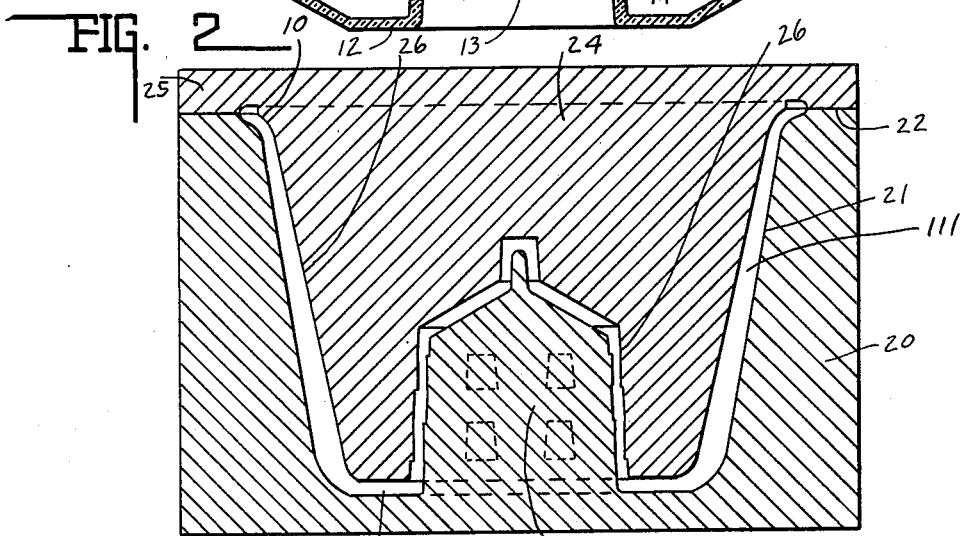
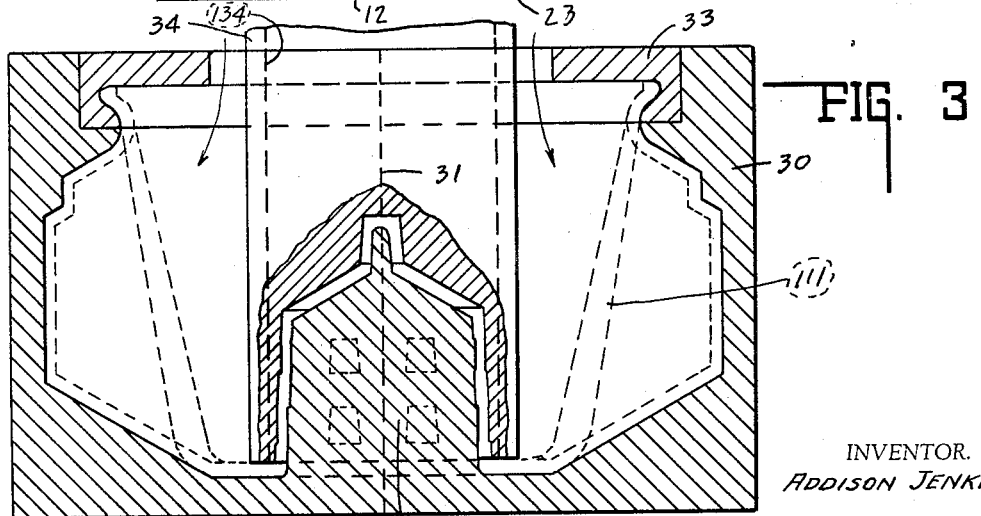
INVENTOR.
ADDISON JENKINS,
BY
Lockwood Lockwood Goldsmith & Galt.
ATTORNEYS.

Patented Nov. 28, 1933

1,937,346

UNITED STATES PATENT OFFICE 1,937,346

PROCESS FOR FORMING INTERIORLY FIGURED VITREOUS BOWLS

Addison Jenkins, Kokomo, Ind., assignor to D. C. Jenkins Glass Company, Kokomo, Ind., a corporation Application November 13, 1931
Serial No. 574,684

3 Claims. (Cl. 49—80)

This invention relates to glass bowls and the like provided with interior ornamentation or a configuration upon the inside of an upwardly directed bottom.

The chief object of this invention is to commercially produce in an economical manner vitreous articles, such as glass bowls, and provide the same with configurations or ornamentations upon the bottom of the bowl and which extend upwardly into the bowl and which configuration is positioned upon the interior surface of the bottom and may, if desired, likewise be positioned upon the exterior of the bottom and, if desired, such configuration may register with each other to form composite configuration.

The chief feature of the invention consists in the process whereby a vitreous article of the character indicated is produced.

Another feature of the invention consists in a glass article produced by the aforesaid process.

The full nature of the invention will be understood from the accompanying drawing and the following description and claims:

In the drawing, Figure 1 is a central sectional view through a glass bowl embodying the invention. Figure 2 is a central sectional view through said apparatus including the vitreous material therein showing one of the steps of the process. Figure 3 is a similar view of the apparatus showing a subsequent step of the process.

The chief distinction of the present invention is that by a combination of steps it is possible to form in the bottom of a glass bowl suitable configurations or ornamentations upon the interior of the bottom and, if desired, upon the exterior as well.

By referring to Figure 1, there is indicated therein a neck 10 of a glass bowl having a body portion 11 and a bottom 12, which bottom extends upwardly into the glass bowl and forms a chamber 13. The upwardly-extending portion of the bottom is suitably ornamented or figured upon its interior, as indicated at 14, and the exterior of said upwardly-extending portion is also ornamented or figured, as at 15. As shown in Figure 1, the ornamentation upon the interior and exterior surfaces of the bottom need not be identical but may register to form a composite configuration or ornamentation. Also, if desired, the exterior ornamentation 15 may be suitably surface colored, which will be exposed through the glass bottom and will, in this way, color the interior configuration or ornamentation.

In Figure 2, there is illustrated a female mold member 20 having a side wall 21, a top 22 and an inwardly-extending projecting portion 23, the surface of which is suitably formed to provide the configuration 15. Into the mold 20 having the cavity 21 for the upwardly-extending projecting portion 23, there is supplied a predetermined amount of glass and this may be supplied by an automatic "gob" discharge arrangement. After the glass is supplied to the female mold, the male mold 24, having the flange 25, the exterior wall 26 and the recessed portion 27, is caused to be received by the female mold which forces the glass therein into the shape indicated, which formation results in the formation of the bottom of the bowl and the neck of the bowl. The bottom is thus suitably elevated and interiorly and exteriorly ornamented. Following this operation, the blank indicated by the numeral 111 is positioned in a blow mold 30 which preferably is parted at 31. Said blow mold includes the upward extension or projection 32 having the same conformation as the upward projection 23 of the female mold 20 so that the blank shown in Fig. 2 and indicated by dotted lines 111 in Fig. 3 registers in the blow mold. Herein, there is also indicated a neck-supporting ring 33 and also a form retainer or mold 34 which is caused to move down and engage the interior surface of the bottom. If desired, as shown by the dotted lines indicated at 134, this form-retaining mold may be tubular and not engage it following its formation during the molding process. After the blank is suitably mounted in the blowing mold 30 and the ornamentation is suitably protected, air pressure is applied to the mold in the usual blowing manner and the heated glass of the blank is caused to stretch and fill the mold, thus forming the completed glass bowl with ornamentation upon the interior and exterior surfaces of the upwardly-directed bottom.

These operations may be accomplished manually or mechanically and, in the latter instance, by multi-stage machinery in which the first stage is the supply and deposition of the proper amount of glass commonly known as the "gob" or "gather" to the press mold. The second stage includes the pressing of the gob or gather into the blank, which pressing simultaneously forms the ornamentation upon the bottom and the neck, then removing the pressing molds and positioning the blank in the blow mold, protecting the configuration, particularly the exterior portion thereof, and, if desired, the interior portion thereof, and then blowing the blank into the completed article.

The invention claimed is:

1. The process of forming a figured vitreous bowl and the like having a relatively large mouth and a reentrant bottom portion comprising simultaneously molding the bowl neck and an oppositely positioned bowl bottom with a reentrant portion extending toward the neck and including figuring upon the interior of the reentrant portion and then blowing the intermediate body portion between the neck and bottom to the desired conformation while holding the figure and indented portion to its original formation.

2. The process of forming a figured vitreous bowl and the like, having a relatively large mouth and a reentrant bottom portion, comprising simultaneously molding the bowl neck and an oppositely positioned bowl bottom with a reentrant portion extending toward the neck and including figuring upon the interior and exterior of the bowl bottom reentrant portion, and then blowing the intermediate bottom portion to the desired conformation while holding the figuring upon the interior and exterior of the reentrant bottom portion.

3. The process of forming a figured vitreous bowl and the like having a relatively large mouth and a reentrant bottom portion, comprising simultaneously molding the bowl neck and an oppositely positioned bowl bottom with a reentrant portion extending toward the neck and including figuring upon the interior and exterior of the bowl bottom reentrant portion, placing the blank so formed in a mold having a chamber and an inwardly projecting portion conforming to the exterior surface of the bowl bottom, inserting in the open neck of the blank a smaller form having a recess conforming to the interior surface of the reentrant bowl portion, and then blowing while heated the intermediate portion of the blank into chamber engagement to form the completed bowl.

ADDISON JENKINS.